(12) United States Patent  
DiFoggio

(10) Patent No.: US 7,511,819 B2
(45) Date of Patent: Mar. 31, 2009

(54) LIGHT SOURCE FOR A DOWNHOLE SPECTROMETER

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 123 days.

(21) Appl. No.: 11/487,211

(22) Filed: Jul. 14, 2006

(65) Prior Publication Data

US 2007/0013911 A1 Jan. 18, 2007

Related U.S. Application Data

(63) Continuation-in-part of application No. 10/985,715, filed on Nov. 10, 2004, now Pat. No. 7,362,422.

(60) Provisional application No. 60/518,965, filed on Nov. 10, 2003.

(51) Int. Cl.
*G01N 21/00* (2006.01)
(52) U.S. Cl. .................. 356/436; 356/441
(58) Field of Classification Search .............. None
See application file for complete search history.

(56) References Cited

U.S. PATENT DOCUMENTS

| 4,490,845 A | 12/1984 | Steinbruegge et al. |
| 4,994,671 A | 2/1991 | Safinya et al. |
| 5,406,082 A | 4/1995 | Pearson et al. |
| 5,498,875 A | 3/1996 | Obremski et al. |
| 5,541,413 A | 7/1996 | Pearson et al. |
| 5,604,582 A | 2/1997 | Rhoads et al. |
| 5,844,667 A * | 12/1998 | Maron ............... 356/35.5 |
| 6,233,746 B1 * | 5/2001 | Skinner .............. 250/227.18 |
| 6,388,251 B1 * | 5/2002 | Papanyan ............ 250/269.1 |
| 6,437,326 B1 * | 8/2002 | Yamate et al. ........ 250/269.1 |
| 6,678,050 B2 * | 1/2004 | Pope et al. ............. 356/435 |
| 6,850,656 B1 * | 2/2005 | Bevilacqua et al. ..... 385/12 |
| 2003/0048432 A1 * | 3/2003 | Jeng et al. ............. 356/39 |
| 2003/0160164 A1 | 8/2003 | Jones et al. |
| 2004/0061858 A1 * | 4/2004 | Pope et al. ............ 356/435 |
| 2004/0069942 A1 * | 4/2004 | Fujisawa et al. ...... 250/269.1 |
| 2004/0129874 A1 | 7/2004 | Torgersen et al. |

OTHER PUBLICATIONS

Schupp et al., Development of a tunable Dode Laser Absorption Spectrometer for Measurements of the 13C/12C Ration in Methane, Chemosphere, vol. 26, Nos. 1-4, 1993, pp. 13-22.

(Continued)

*Primary Examiner*—Michael P Stafira
(74) *Attorney, Agent, or Firm*—G. Michael Roebuck

(57) ABSTRACT

The present invention provides an apparatus and method for high resolution spectroscopy using a narrow light beam source such as a superluminescent diode (SLD) and a tunable optical filter (TOF) for analyzing a formation fluid sample downhole and at the surface to determine formation fluid parameters. The SLD and TOF have a matching etendue. The analysis comprises determination of gas oil ratio, API gravity and various other fluid parameters which can be estimated after developing correlations to a training set of samples using a neural network or a chemometric equation.

18 Claims, 5 Drawing Sheets

OTHER PUBLICATIONS

Fiber Fabry-Perot Tunable Filter, Digital Lightwave, FFPTF 7-2002A, 2002.
OSA-ENG TFM2000 Optical Spectrum Analyzer Engine, NP Photonics, 2002.
TFM Series High Performance Tunable filters, NP Photonics, 2003.
NP Photonics Unveils Optical Spectrum Analyzer Engine, Sep. 16, 2002.
http://thorlabs.com, Optoelectronics, Scanning Fabry Perot, SA200-14A, retrieved Nov. 21, 2006.
The Photonics Dictionary, Book 4, 44th International Edition, 1998.
http://hyperphysies,phy-astr.gsu.edu/hbase/phyopt/fabry.html, Fabry-Perot Interferometer, retrieved Nov. 21, 2006.
J. Houston Miller, Cavity-Enhanced Methods for the Detection of Trace Air Constituents Using Continuous Wave Diode Lasers, Advanced Technology Seminar, NCAR Atmospheric Technology Division, Mar. 2003.
http://www.laser2000.co.uk/fibres/specs/specs010.htm, Laser 2000, High Performance Tunable filters, retrieved Sep. 30, 2003.
http://www.solustech.com/solutions/technology, Introducing Compliant MEMS Technology, retrieved Nov. 21, 2006.
http://www.solustech.com/news_events/press_room/Feb_11_02.htm, Solus Micro Technology Opens U.K. Facility, retrieved Nov. 21, 2006.

* cited by examiner

LIGHT SOURCE FOR A DOWNHOLE SPECTROMETER

CROSS REFERENCE TO RELATED APPLICATIONS

This application is a continuation-in-part of U.S. application Ser. No. 10/985,715 filed Nov. 10, 2004, now U.S. Pat. No. 7,362,422 entitled Method and Apparatus for a Downhole Spectrometer Based on Electronically Tunable Optical Filters and published as U.S. 20050099618 on May 12, 2005. The full disclosure of which is hereby incorporated by reference herein and claims priority from U.S. Provisional patent application Ser. No. 60/518,965 filed on Nov. 10, 2003.

BACKGROUND OF THE INVENTION

1. Field of the Invention

The present invention relates generally to the field of downhole sampling of hydrocarbons and in particular to downhole and onsite surface high resolution spectroscopy of hydrocarbon samples for measurement and estimation of physical and chemical properties of fluid from a downhole formation before, during or after sample capture in a sample chamber.

2. Background Information

In the oil and gas industry, formation testing tools have been used for monitoring formation pressures along a wellbore, obtaining formation fluid samples from the wellbore and predicting performance of reservoirs around the wellbore. Such formation testing tools typically contain an elongated body having an elastomeric packer that is pressed against the zone of interest in the wellbore to collect formation fluid samples in storage chambers placed in the tool.

During drilling of a wellbore, a drilling fluid ("mud") is used to facilitate the drilling process and to maintain a pressure in the wellbore greater than the fluid pressure in the formations surrounding the wellbore. This is particularly important when drilling into formations where the pressure is abnormally high. If the fluid pressure in the borehole drops below the formation pressure, there is a risk of blowout of the well. As a result of this pressure difference, the drilling fluid penetrates into or invades the formations for varying radial depths (referred to generally as invaded zones) depending upon the types of formation and drilling fluid used. The formation testing tools retrieve formation fluids from the desired formations or zones of interest, test the retrieved fluids to ensure that the retrieved fluid is substantially free of mud filtrates, and collect such fluids in one or more chambers associated with the tool. The collected fluids are brought to the surface and analyzed to determine properties of such fluids and to determine the condition of the zones or formations from where such fluids have been collected.

One feature that most formation testing tools have in common is a fluid sampling probe. This may consist of a durable rubber pad that is mechanically pressed against the rock formation adjacent the borehole, the pad being pressed hard enough to form a hydraulic seal. Through the pad is extended one end of a metal tube that also makes contact with the formation. This tube ("probe") is connected to a sample chamber that, in turn, is connected to a pump that operates to lower the pressure at the attached probe. When the pressure in the probe is lowered below the pressure of the formation fluids, the formation fluids are drawn through the probe into the well bore to flush the invaded fluids prior to sampling. In some formation tests, a fluid identification sensor determines when the fluid from the probe consists substantially of formation fluids; then a system of valves, tubes, sample chambers, and pumps makes it possible to recover one or more fluid samples that can be retrieved and analyzed when the sampling device is recovered from the borehole.

It is desirable that only uncontaminated fluids are collected, in the same condition in which they exist in the formations. Commonly, the retrieved fluids are found to be contaminated by drilling fluids. This may happen as a result of a poor seal between the sampling pad and the borehole wall, allowing borehole fluid to seep into the probe. The mud cake formed by the drilling fluids may allow some mud filtrate to continue to invade and seep around the pad. Even when there is an effective seal, borehole fluid (or some components of the borehole fluid) may "invade" the formation, particularly if it is a porous formation, and be drawn into the sampling probe along with connate formation fluids.

U.S. Pat. No. 4,994,671 issued to Safinya et al. discloses a device in which visible and near infrared (IR) analysis of the fluids is performed in the borehole, without having to transport recovered samples of the fluid to the surface for chemical analysis. The infrared portion part of the electromagnetic spectrum (0.8 to 25 µm wavelength region, or equivalently wavenumbers of 12500 to 400 $cm^{-1}$) of a substance contains absorption features due to the molecular vibrations of the constituent molecules. The absorptions arise from both fundamentals (single quantum level transitions occurring in the mid-infrared region from 2.5-25.0 microns) and combination bands and overtones (multiple quantum level transitions occurring in the mid- and the near-infrared region from 0.8-2.5 microns). The position (frequency or wavelength) of these absorptions contain information as to the types of molecular structures that are present in the material, and the intensity of the absorptions contains information about the amounts of the molecular types that are present. To use the information in the spectra for the purpose of identifying and quantifying either components or properties requires that a calibration be performed to establish the relationship between the absorbances and the component or property that is to be estimated. For complex mixtures, where considerable overlap between the absorptions of individual constituents occurs, such calibrations are accomplished using various chemometric data analysis methods.

In complex mixtures, each constituent generally gives rise to multiple absorption features corresponding to different vibrational motions. The intensities of these absorptions, to first order, will all vary together in a linear fashion as the concentration of the constituent varies. Such features are said to have intensities which are correlated in the frequency (or wavelength) domain. This correlation allows these absorptions to be mathematically distinguished from random spectral measurement noise which shows no such correlation. The linear algebra computations which separate the correlated absorbance signals from the spectral noise form the basis for techniques such as Principal Components Regression (PCR) and Partial Least Squares (PLS). As is well known, PCR is essentially the analytical mathematical procedure of Principal Components Analysis (PCA), followed by regression analysis. Second order effects include spectral changes resulting from changes in temperature or pressure. For example, these environmental factors change the intermolecular spacing and the degree to which the spectrum of one molecule is affected by the presence of its neighbors, such as the degree of hydrogen bonding. Nonlinear methods such as neural networks may also be used to correlate fluid composition and properties to the spectra.

PCR and PLS have been used to estimate elemental and chemical compositions and to a lesser extent physical or thermodynamic properties of solids, liquids and gases based on their mid- or near-infrared spectra. These chemometric methods involve: [1] the collection of mid- or near-infrared spectra of a set of representative samples; [2] mathematical treatment of the spectral data to extract the Principal Components or latent variables (e.g. the correlated absorbance signals described above); and [3] regression of these spectral variables against composition and/or property data to build a multivariate model. The analysis of new samples then involves the collection of their spectra, the decomposition of the spectra in terms of the spectral variables, and the application of the regression equation to calculate the composition/properties.

In Safinya et al. light the visible and near IR region is passed through the fluid sample. A spectrometer measures the spectrum of the transmitted and the back scattered light, and knowing the spectrum of the incident light, transmission and backscattered absorption spectra for the sample are determined. Using absorption spectra of water, gas, crude and refined oils, and drilling fluids, a least squares analysis is performed that models the observed spectra as a weighted sum of the spectra of its components, the least squares analysis giving the composition of the fluid in terms of weights of the various components.

Currently spectral analysis downhole and on site analysis for fixed single color interference filters is limited to around 11-30 nm full width at half maximum filters thus providing relatively low spectroscopic resolution. These filters are not suitable to distinguish between closely spaced spectral peaks or to identity isotopes whose spectral peak spacing's are much smaller than 11 nm. Thus, there is a need for an analysis technique suitable for downhole and onsite surface spectroscopic analysis of hydrocarbon samples with high resolution.

SUMMARY OF THE INVENTION

The present invention provides an apparatus and method for onsite surface and downhole spectral analysis of hydrocarbon related samples collected downhole in an earth boring or well bore. The present invention provides a light source having a geometrically narrow beam such as a superluminescent diode (SLD) in conjunction with a tunable optical filter (TOF) for use in a high resolution spectrometer (HRS) and estimation of physical and chemical properties associated with a formation fluid or gas from these HRS measurements. Although a laser diode has a geometrically narrow beam, it only generates light at one wavelength. A superluminescent diode generates light over a band of wavelengths so it can be used in conjunction with a tunable optical filter to create a spectrometer that spans the range of wavelengths produced by the SLD.

A sorption cooling apparatus is also provided to cool the SLD/TOF downhole if desired. In an exemplary embodiment a SLD/TOF for HRS is provided downhole for real time HRS measurements and estimation of parameters of interest from the HRS measurements. In another embodiment HRS is performed at the surface onsite or in the tool or via a separate HRS system attached at the surface. The SLD/TOF HRS of the present invention is also useful for analysis of gases and liquids and isotopes thereof while flowing in distribution pipelines to estimate or determine the purity, grade and identity of hydrocarbons or other fluids and gases.

In a particular embodiment a method is disclosed for estimating a property of a formation fluid. The method includes exposing an optical filter to a narrow light beam from a light beam source, exposing the fluid to light output from the filter, measuring a light output interaction with the fluid and estimating a property of the formation fluid from the measured interaction. In another aspect of a particular embodiment the light source is a superluminescent diode. In another aspect of a particular embodiment the method further includes tuning the filter to a wavelength that overlaps a wavelength for the narrow light beam. In another aspect of a particular embodiment the method further includes launching the narrow light beam through an optical fiber onto the filter. In another aspect of a particular embodiment the method further includes choosing a light source whose etendue is as small as possible and, ideally, less than or equal to the etendue of the tunable optical filter so as to maximize light transfer from the light source to the tunable optical filter. For the purpose of this disclosure, we call this aspect the "matching" of the etendue of light source and target. In another aspect of a particular embodiment the optical filter further includes a tunable optical filter having a first member and a second member, wherein the first member and the second member are substantially parallel and not directly in contact with one another. In another aspect of a particular embodiment the method further includes modulating a distance between the first member and the second member to select a wavelength of light passed by the filter and wherein exposing further includes transmitting the selected wavelength of light from light source to the optical filter.

In another aspect of a particular embodiment the method further includes exposing a second optical filter to the narrow light beam, exposing a secondary formation fluid to a second output light from the second optical filter, measuring an interaction between the second output light and the secondary formation fluid, estimating a property of the secondary formation fluid from the measured interaction, comparing the property of the formation fluid to the property of the secondary formation fluid and determining whether the formation fluid derives from the same formation compartment as the secondary formation fluid.

In another aspect of a particular embodiment the narrow light beam has a diameter in a range between 1 micron and 100 microns. In another aspect of a particular embodiment wherein the narrow light beam has a diameter of approximately 8 microns. In another aspect of a particular embodiment the method further includes estimating at least one of carbon number distribution and percentage of drilling mud contamination.

In another particular embodiment an apparatus for estimating a property of a formation fluid is disclosed. The apparatus includes a narrow light beam source; a system in optical communication with the light source, the system including a) a first optical filter and b) a formation fluid; a sensor in optical communication with the system; and a processor in data communication with the sensor, wherein the processor estimates the property of the formation fluid from the sensor output.

In another aspect of a particular embodiment the narrow light beam source is a superluminescent diode. In another aspect of a particular embodiment the optical filter is a tunable optical filter tuned to a wavelength overlapping a wavelength for the narrow light beam source. In another aspect of a particular embodiment the optical filter further comprises a first member substantially parallel to a second member with which the first member is not in direct contact, the apparatus further includes a circuit that modulates a distance between the first member and the second member. In another aspect of a particular embodiment the apparatus further includes a second system including a) a second optical filter and b) a secondary formation fluid; wherein the second system is in optical communication with the narrow light beam source and the sensor; and wherein the processor compares the sensor output of the system to the sensor output from the second system in order to estimate the property of the formation fluid.

In another aspect of a particular embodiment the circuit further includes a device that modifies a distance between the first member and the second member selected from the group of a piezoelectric element and a micro-electromechanical device. In another aspect of a particular embodiment the light source has an etendue that is less than or equal to the etendue of the optical filter. In another aspect of a particular embodiment the apparatus further includes an optical fiber in optical communication with the light source and optical filter. In another aspect of a particular embodiment wherein the narrow light beam source emits a light beam having a diameter substantially in the range of 1-100 microns. In another aspect of a particular embodiment wherein the light beam source emits a light beam having a diameter of substantially 8 microns. In another aspect of a particular embodiment the processor estimates at least one of carbon number distribution and percentage of drilling mud contamination.

In another particular embodiment a downhole tool for estimating a property of a formation fluid is disclosed. The apparatus includes a superluminescent diode that illuminates an optical filter in optical communication with the formation fluid; a photodetector that measures an interaction between light output from the filter with the formation fluid; and a processor in data communication with the photodetector that estimates a property of the formation fluid from the measured interaction from the photodetector.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE FIGURES

For detailed understanding of the present invention, references should be made to the following detailed description of the embodiment, taken in conjunction with the accompanying drawings, in which like elements have been given like numerals.

DETAILED DESCRIPTION

Figure 1:
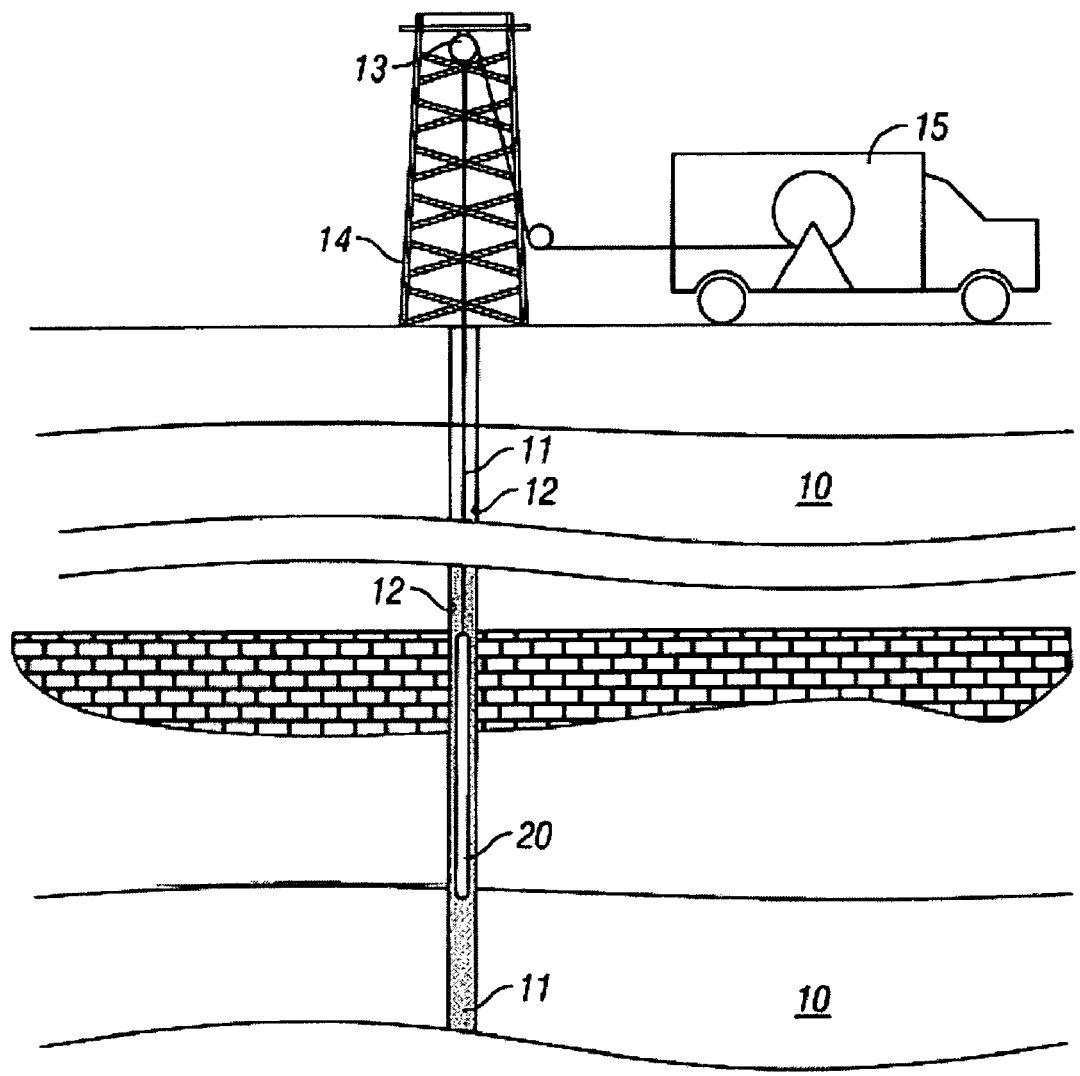
FIG. 1 is a schematic earth section illustrating an illustrative embodiment of the invention operating environment.

Superluminescent diodes (SLDS) are relatively narrow beam diameter semiconductor light sources based on superluminescence. For purposes of this disclosure SLDs and similar light sources having a beam diameter on the order of 8 microns (or around the range of 1 micron to 100 microns) are referred to as "narrow beam light sources". Superluminescent diodes (also sometimes called superluminescence diodes or superluminescent LEDs) are optoelectronic semiconductor devices which are emitting narrow bandwidth or broadband optical radiation based on superluminescence. SLDs are similar to laser diodes, containing an electrically driven p-n junction and an optical waveguide, but lack optical feedback, so that no laser action occurs. Optical feedback, which could lead to the formation of cavity modes and thus to pronounced structures in the spectrum and/or to spectral narrowing, is suppressed by means of tilting the output facet relative to the waveguide, and can be suppressed further with anti-reflection coatings.

Superluminescent diodes are bright like a laser diode and they also have a small beam diameter like a laser diode so their light can be launched into very small diameter optical fibers (such as 8 micron core size) without substantial light loss. The latter attribute is useful because tunable optical filters often have very small active areas (8 to 80 microns in diameter) and the best way to achieve optical coupling to this small active area is by using a small diameter optical fiber. Unlike a laser diode, which produces light at substantially one wavelength, a superluminescent diode produces light over tens of nanometers and, in some cases, over a hundred nanometers (i.e., also referred to as a "narrow band" light source in and for purposes of this disclosure, which is an attribute that is unrelated to having a geometrically "narrow beam"). Having a source light that spans more than one wavelength is a useful attribute for any spectrometer that is based on a tunable optical filter.

Etendue is a measure of the light-concentrating and light-coupling constraints on an optical system. The larger the etendue of the light target as compared to the etendue of the light source, the easier it is to transfer all of the light from source to target. However, if the target etendue is smaller than the etendue of the source, then it is difficult if not impossible to transfer all of the light to the target and some light is lost in the transfer. In two dimensions, etendue is the product of the width of the limiting aperture with the angle of divergence of light out of that aperture. In three dimensions, etendue is the product of the area of the aperture with the solid angle subtended. Regardless of what lenses or mirrors are used, a light beam cannot be concentrated more than physics allows. Because of etendue constraints, it is preferable to start with a geometrically narrow beam of light, such as that from a superluminescent diode, so that one can launch a much larger fraction of the source's light into a small diameter (8 micron core) optical fiber or directly into a small diameter (50 micron diameter) tunable optical filter than one would be able to launch when using light from an geometrically extended (large diameter light beam) source such as a hot tungsten filament. Of course, one could first launch narrow light beam such as an 8 mm diameter beam from an SLD into an optical fiber and then optically couple this fiber to a tunable optical filter.

Most superluminescent diodes are used in the wavelength regions around 800 nm, 1300 nm, and 1550 nm. However, other wavelengths are available. Typical output powers are in the range of a few milliwatts up to some tens of milliwatts, i.e., much higher than for LEDs. The optical bandwidth is usually some tens of nanometers, sometimes even above 100 nm. The coherence length is often a few tens of microns, sometimes even only a few microns.

SLDs are an edge-emitting semiconductor light source that combines high power and brightness of laser diodes with low coherence of edge-emitting light emitting diode (ELED). An SLD can emit a single spatial mode light of the same power as a single mode diode laser with ELED-graded spectrum width. Superlum Diodes Ltd., P.O. Box 70, B-454 Moscow 117454 Russia offer SLD with SM fiber coupled power up to 20 mW ex fiber. The "Superlum" wide spectrum SLD series allows coherence lengths less than 10 μm.

The unique property of superluminescent diodes (SLD) is the combination of laser-diode-like small beam diameter and high output power (brightness) with LED-like optical spectrum. Such combination is allowed by high optical gain in semiconductor laser materials and its optical spectrum. Any "ideal" SLD is optimized traveling wave laser diode amplifier with zero reflections from the ends of active channel. In every SLD two counter-propagating beams of amplified spontaneous emission are traveling along active region. In terms of output power, SLD performance may be described relatively well by simple model that does not take into account spectral effects and considers uniform distribution of carriers' density in SLD active region.

A high resolution spectrometer (HRS) having a resolution up to 10 pico meters is described in DiFoggio et al., U.S. Ser. No. 10/985,715 ('715), filed Nov. 10, 2004 and entitled A Method and Apparatus for a Downhole Spectrometer Based on Electrically Tunable Optical Filters (TOF). The DiFoggio '715 describes an HRS spectrometer that uses a tunable optical filter with a relatively narrow band pass.

Due to both the narrow band pass and small etendue of the TOF and the relatively large etendue of even a small tungsten filament, it is difficult to get a sufficient amount of white light from a large etendue broadband light source, such as a tungsten bulb light source into the small diameter (8-micron) an input fiber of a TOF, such as a Fabry-Perot tunable optical filter such as that made by Micron Optics to collect a spectrum. These TOFs are designed to be coupled to several-watt laser light sources in the telecommunications industry.

In an illustrative embodiment superluminescent diode (SLD) light source is coupled it to the fiber input of a tunable optical filter. Like a laser, an SLD is bright. Also, like a laser, an SLD has a narrow beam diameter (i.e., 8-microns diameter or in general in a range of 1-100 microns diameter beam for a SLD) so it can efficiently launch its light into a small-diameter optical fiber. However, like an LED (but unlike a laser), a SLD produces light over a band of wavelengths instead of at just a single wavelength. Therefore, in an illustrative embodiment, an SLD TOF combination is provided. An appropriately-matched TOF (same or overlapping wavelength range as the SLD) is provided to collect sample spectra over the band of wavelengths generated by a matched SLD source.

Currently, the inventor is unaware of any high-resolution (1 nm or better) downhole optical spectrometer. Having such a spectrometer, which also covers the hydrocarbon band, could provide much better characterization of crude oils. It might also permit quantifying the percentage of oil based mud filtrate contamination in crude oil samples. Many oil-based muds contain synthetic base oils that have chemical bonds that are rarely found in crude oils. For example, some synthetic base oils contain olefin bonds (carbon-carbon double bonds) and others contain ester bonds (carbon-oxygen single or double bonds). Therefore, for linear alpha olefin muds, the olefin infrared absorption peak is a measure of filtrate contamination in a crude oil sample. For ester based muds, the ester infrared absorption peak is a measure of filtrate contamination.

In an illustrative embodiment, an SLD is attached to a single-mode (small-diameter) fiber input of a TOF. Light exiting from the fiber optic output of the TOF is directed through a sample and then on to an optical detector in the HRS. In an illustrative embodiment, a circuit is provided to change the voltage on the TOF to change its transmitted wavelength. The process is repeated to collect a high resolution transmission spectrum for the sample.

Because all semiconductor light sources lose intensity with increasing temperature, it may be desirable to provide active cooling of the superluminescent diode such as sorption cooling, thermo-tunneling or thermoelectric cooling, or some other method. It may also be beneficial to provide active cooling of the photodetector to obtain better signal to noise. The construction details of an SLED also affects its high temperature operation. In 2005, Exalos Corporation showed that power drop of a standard bulk InGaAsP SLED was about 3.1 dB per 10 C but that the power drop of their quantum dot InAs SLED was only 0.54 dB per 10 C so that it should continue to operate at 125 C.

In an illustrative embodiment, a superluminescent diode (SLD) light source and a tunable optical filter (TOF) are provided. The SLD is selected to output light in the frequency band in which the TOF passes light. The SLD can be selected from numerous commercially available SLDs provided by, for example, QPhotonics of Chesapeake, Va., USA, Super-Lum of Moscow, Russia and Exalos Corporation of Zurich, Switzerland. The TOF can be selected from electronically tunable optical filters (currently commercially available including Fabry-Perot, and Complaint Micro Electromechanical Systems, etc.) to collect high resolution spectra of downhole fluids to estimate or determine physical properties and composition (synthetic chromatogram), oil-based mud filtrate contamination, $H_2S$, and $CO_2$ concentrations for downhole fluids. In the past, these electronically tunable filters have been primarily used by the telecommunications industry to multiplex communications. A Fabry Perot tunable optical filter is provided in the present example of the invention. The Fabry-Perot TOF tunes the filter by changing the spacing between the sides of an etalon with a Complaint Micro Electromechanical Systems or with a piezoelectric device.

The SLD provides high light output over a high wavelength resolution band matched to a TOF wavelength resolution. The SLD is also referred to herein for purposes of this description as a narrow beam light source. Light sources other than SLDs may be used as a narrow beam light source as long as the light source generated sufficient light within the bandwidth of the optical filter with which it is combined in an HRS. In an illustrative embodiment, the SLD or another narrow beam light source provides a narrow diameter beam such as 1-100 microns and in particular 8 microns. The narrow beam light source, e.g., SLD, launches light into a narrow diameter optical fiber such as a fiber having an 8 micron core diameter without substantial loss of light. In a particular embodiment the light from the SLD is passed through the narrow diameter optical fiber to the TOF and subsequently through a fluid to an optical detector portion of the spectrometer. The TOFs provide high wavelength resolution as fine as 20 to 60 picometers downhole, thereby providing high resolution spectroscopy far surpassing any known downhole spectroscopy. The tunable wavelength range of TOF units has increased in recent years to 100 nanometers or more. Most of the currently-available TOF units are rated to 80° C. by their manufacturer. Thus, the present invention provides, when desired, sorption cooling or another type cooling system to overcome that temperature limitation to enable operation at downhole temperatures.

There are numerous advantages to using a rapidly tunable optical filter such as an electronically tunable TOF. One advantage of one particular illustrative embodiment of the present invention is that it uses only a single detector to accomplish HRS which in the past was not available downhole. Another advantage of another particular illustrative embodiment is that a TOF can be tuned to match the band width of light emitted by a narrow beam light source. The present invention, provides HRS for estimating parts per million of $H_2S$ in a fluid or gas. The present example of the invention provides a single detector, rather than trying to synchronize or calibrate the response of two detectors at temperature and pressure downhole or even at the surface. Furthermore, because the present invention can rapidly tune or change the color transmitted by the tunable optical filter, the present invention also performs wavelength modulation spectroscopy (WMS).

The present invention uses wavelength modulation spectroscopy (WMS), to obtain the first derivative of an absorption spectrum about some center wavelength by modulating the optical filter's wavelength about that center wavelength. To calculate the change in absorbance (rather than absorbance, itself) using WMS, it is no longer necessary to know how much light entered the sample but only how much the transmitted light changed from its average value during the wavelength modulation. Thus, by applying WMS, the present invention collects spectra using a "single beam" instrument with better accuracy than a known "dual beam" instrument. WMS is performed by modulating the distance between two members in the optical filter.

By definition, the absorbance A at wavelength $\lambda$ is $A(\lambda)=\log_{10}[I_0(\lambda)/I(\lambda)]$ (1)

where $I_0$ is the intensity of light entering the sample and I is the intensity of light exiting the sample. Modulating the wavelength of light from $\lambda_1$ to some nearby wavelength, $\lambda_2$, then the change in absorbance, $\lambda A$, is given by, $\Delta A = A(\lambda_2)-A(\lambda_1)=\log_{10}[I_0(\lambda_2)/I(\lambda_2)]-\log_{10}[I_0(\lambda_1)/I(\lambda_1)]$ (2)

$\Delta A=\log_{10}[I_0(\lambda_2)/I_0(\lambda_1)]-\log_{10}[I(\lambda_2)/I(\lambda_1)]$ (3)

One defines, $\Delta I=I(\lambda_2)-I(\lambda_1)$ (4)

By modulating over a spectral region where the sample's absorbance is changing rapidly with wavelength (near an absorbance peak), one can assume that the fractional change in incident (source) intensity with wavelength is small compared to the fractional change in transmitted intensity with wavelength. That is, we assume that $I_0(\lambda_2)/I_0(\lambda_1)=1$ so that the first logarithmic term of (3) vanishes. Then, substituting (4) into the remaining term of (3) to obtain, $\Delta A=-\log_{10}[(I(\lambda_1)+\Delta I)/I(\lambda_1)]=-\log_{10}[1+\Delta I/I(\lambda_1)]$ (5)

Note that $\Delta A$ now has no dependence on source intensity so it is not necessary to use a second detector to obtain the source intensity or to use an optical multiplexer to shuttle between source and transmitted light impinging on a single detector. This eliminates the need for a second detector (which is very hard to exactly calibrate against the first detector, especially at extreme downhole temperatures) and eliminates the need for a multiplexer to switch between the two intensities.

Because $\Delta\lambda=\lambda_2-\lambda_1$, is very small, we can assume that $\Delta I << I(\lambda_1)$. Then, defining $\epsilon$, $\epsilon=\Delta I/I(\lambda_1)$. (6)

Note that $\Delta I$ can be considered as an "AC" signal which is modulated by modulating $\lambda_2$ about a fixed $\lambda_1$. Similarly, $I(\lambda_1)$ can be considered as a "DC" signal at a fixed $\lambda_1$. The ratio, $\epsilon$, of "AC" to "DC" is used to calculate $\Delta A$. In this way, absorbance spectroscopy can be done without determining baseline light transmission through an empty sample cell.

Then, one can employ the expansion for the natural logarithm about unity, $\ln(1+\epsilon)=\epsilon-\epsilon^2/2+\epsilon^3/3-\epsilon^4/4+\ldots$ for $-1<\epsilon\leq 1$ (7)

and the identity, $\log_a(N)=\log_b(N)/\log_b(a)$ to write, $\Delta A=-[\epsilon-\epsilon^2/2+\epsilon^3/3-\epsilon^4/4+\ldots]/2.303$ (8)

Finally, one estimates the first derivative of spectrum about $\lambda_1$ as $\Delta A/\Delta\lambda=-[\epsilon-\epsilon^2/2+\epsilon^3/3-\epsilon^4/4+\ldots]/(2.303 \Delta\lambda)$ (9)

In an alternative embodiment, there are volume phase grating technologies used by the telecommunications industry that can be used to divide up white light into fine color channels wherein each color is at a slightly different physical position. With such a device, the spectrum is read with an array of photodetectors. A MEMs mirror or other light-redirecting component is provided to electronically tune and select which color in this array of colors falls on a single detector. Alternatively, a tunable optical grating such as the MEMS grating made by Polychromix of Wilmington, Mass. could be used.

The present invention provides a high-resolution spectrometer using a superluminescent diode (SLD) light source and tunable optical filter (TOF) to enable high-resolution spectral measurements to determine or estimate physical and chemical properties of a gas or fluid, including the percent of oil-based mud filtrate contamination in crude oil samples. For purposes of the present description, high resolution spectrometry is defined as spectroscopy having a resolution of better than 10 nanometers. The present invention provides variable resolution on the order 10 nanometers to 10 picometers. The present invention also enables spectral measurements to determine or estimate the mole fraction or percent of chemical groups (aromatics, olefins, saturates) in a crude oil or gas sample. The present invention also enables high-resolution spectral measurement to determine or estimate or directly measure gas oil ratio (GOR).

The present invention provides a high-resolution spectrometer (HRS) using a SLD in conjunction with a TOF to enable high-resolution spectral measurement to determine or estimate the composition of a sample or to determine or estimate other parameters of interest about a sample, such as to estimate if a crude oil sample contains wet gas or dry gas ($C_1$ vs $C_2$, $C_3$, $C_4$). The present invention is also suitable for use in a pipeline, refinery or laboratory. The present invention provides a high-resolution spectrometer using a TOF to enable high-resolution spectral measurement to determine or estimate $CO_2$ in methane gas or $CO_2$ dissolved in crude oil.

The present invention provides an high-resolution spectrometer using a SLD and TOF to enable high-resolution spectral measurement to provide improved correlation of spectral measurements to physical properties (API Gravity, cloud point, bubble point, asphaltene precipitation pressure, etc.) or chemical properties (acid number, nickel, vanadium, sulfur, mercury, etc.) of crude oil $^{13}C/^{12}C$ isotopes of methane as a gas (i.e. not dissolved in a liquid).

The present invention uses the high-resolution spectrometer using a SLD and TOF to provide high-resolution spectral measurement to determine or estimate the phytane/pristane ratios of crude oil.

The present invention provides a high-resolution spectrometer using a SLD and TOF to enable high-resolution spectral measurement to determine or estimate the $H_2S$ that is dissolved in crude oil. (NIR absorbance of 100% $H_2S$ is very weak, so the absorbance of 10 ppm of $H_2S$ is even weaker). The present invention provides a high-resolution spectrometer using a SLD and TOF to enable high-resolution spectral measurement to determine or estimate the $^{17}O/^{18}O$ isotopes of water. The present invention provides a high-resolution spectrometer using a SLD and TOF to enable high-resolution spectral measurement to determine or estimate obtaining "synthetic" course-scale gas chromatograms (the envelope of $C_1$, $C_2$, $C_3$), which is the oil's carbon number distribution. The present invention provides a high-resolution spectrometer using a SLD and TOF to enable high-resolution spectral measurement to determine or estimate the $^{13}C/^{12}C$ isotopes of methane gas while it is still dissolved in liquid crude oil.

The present invention provides a high resolution SLD/TOF for spectral measurements from which a correlative equation derived from soft modeling such as least mean squares, chemometrics or a neural network to infer physical and chemical properties of sample formation fluids or other fluids, to a degree not previously thought possible by spectroscopy downhole. The present invention takes advantage of the TOF's rapid wavelength switching capability to perform high resolution derivative spectroscopy or WMS to find spectral peaks on a shoulder of another peak or to greatly improve signal to noise and makes it possible to observe subtle changes (e.g., 10-20 parts per million (ppm) $H_2S$), not previously possible downhole with lower resolution conventional mid infrared (MIR) and near infrared (NIR) spectroscopy.

A SLD and TOF are provided in a HRS to perform high-resolution spectroscopy. For example, the HRS can be used to resolve the extremely subtle spectral differences between $^{13}C$ methane gas from $^{12}C$ methane gas provided that the pressure is not so high as to cause excessive pressure-broadening of these peaks to the point that they merge. In one embodiment, a membrane inlet separates gas and vapor from liquid formation fluid as described in applicant's co pending US applications, 20060032301 and 20050205256. The membrane inlet can lead to a vacuum cell in which spectroscopy of the gas and vapor sample is performed. The inventor is not aware of any SLD or TOF being used for high resolution spectroscopy of formation fluids downhole or at the surface.

In one example of the invention, wavelength regions such as the hydrocarbon band, $CO_2$ band, $H_2S$ band, and the $H_2O$ band are selected for SLD, HRS and WMS spectral coverage and tuning within these bands. In an exemplary embodiment, the present invention spectrally separates isotopes of liquid water or isotopes of methane when either is dissolved in crude oil or natural gas. A laboratory Fourier transform infrared (FTIR) spectrometer typically provides a 100 to 1000 times wider wavelength range but less wavelength resolution. An FTIR laboratory spectrometer typically provides a wavelength resolution of 1 $cm^{-1}$ ("wave numbers"). One can convert from wavelength resolution to wavenumber resolution by noting that, if one can resolve $\lambda_1$ from $\lambda_2$, then the wavenumber resolution is $(1/\lambda_1)-(1/\lambda_2)=(\lambda_2-\lambda_1)/(\lambda_1\lambda_2)=\Delta\lambda/(\lambda_1\,\lambda_2)$ where $\lambda$ are given in centimeters. Thus, for a TOF with wavelength resolution, $\Delta\lambda=20\times10^{-12}$ meters, the corresponding wavenumber resolution near the center of the hydrocarbon band at 1740 nm is $(20\times10^{-10}\text{ cm})/(1740\times10^{-7}\text{ cm})^2=0.066$ $cm^{-1}=0.066$ wavenumbers.

SLD and TOF HRS is provided for gas analysis taking advantage of the SLD and TOF high resolution and ability to resolve the rotational splitting of the vibrational bands. In the present invention, the SLD and/or TOF are rapidly tuned when used for WMS spectroscopy. Thus, the SLD and TOF are useful to analyze for highly reactive systems such as free radicals, carbon clusters, ions, various reactive metal compounds, and weakly bound complexes.

Having a high temperature SLD and TOF HRS fabricated or combining a SLD and TOF with downhole sorption cooling or another cooling mechanism overcomes temperature issues of operating in a high temperature downhole environment. For sorption cooling, the SLD and TOF are placed in thermal contact with a source of water (either liquid or as hydrate). The SLD and/or TOF are cooled as the water is evaporated from liquid or released by hydrate. The resulting water vapor is sorbed by a sorbent, which becomes hotter in the process. The sorbent transfers its excess heat to the well bore fluid with which it is in thermal contact through the tool housing.

The present invention enables quantification of aromatics, olefins (unlikely in crude oil but common in OBM filtrate), saturates, methane, ethane, propane, and butane. The present invention determines or estimates the percentage of oil based mud filtrate contamination downhole, particularly if the base oil is aromatic-free (unlike crude oil) but olefin-rich (also unlike crude oil).

Furthermore, with very high resolution, the present invention determines or estimates the isotopic ratios of methane ($^{13}C/^{12}C$) or isotopic ratios of water (for different oxygen isotopes) and quantifies gases such $CO_2$ (e.g., 1434 nm=6975 $cm^{-1}$, 1572 nm=6361 $cm^{-1}$, 1961 nm=5100 $cm^{-1}$, 1996 nm=5010 $cm^{-1}$, 2058 nm=4860 $cm^{-1}$) or $H_2S$ (e.g. 1313 nm=7616 $cm^{-1}$, 1578 nm=6337 $cm^{-1}$, 1934 nm=5170 $cm^{-1}$).

In the present example of the invention, SLDs and TOFs are provided for very high resolution spectroscopy for gas and fluids at the surface and downhole. For example, SLDs and TOFs are provided to quantify one gas in the presence of many others or even to quantify different isotopes of the same gas present in a sample. In one embodiment, by changing the color (frequency) of the SLD and TOF light passed on to the sample, that is, by tuning the SLD and TOF, the present invention also performs Raman spectroscopy in combination with a single wavelength detector for the light that is Raman scattered by the sample.

One difficulty with implementing a SLD and TOF spectrometer downhole is temperature. Typically, manufacturers rate tunable optical filters to temperatures of 80° C. or less. The inventor is aware of SLDs and TOFs being operated up to about 95° C.

The present example of the invention combines a tunable optical filter with a downhole sorption cooling system, when desired. The sorption cooling system cools the SLD and TOF HRS to assist operating the SLD and TOF HRS at high ambient temperatures downhole while performing spectral measurements. The SLD and TOF are placed in thermal contact with a source of water (either as a liquid or as a hydrate). The SLD and TOF are cooled as water is evaporated from liquid or released by hydrate. The resulting water vapor which carries heat away from the TOF and is sorbed by a sorbent, which becomes hotter in the process. The sorbent transfers its excess heat to the well bore fluid with which it is in thermal contact.

In an exemplary embodiment, a SLD and TOF are used in an HRS to perform high resolution spectroscopy (10 picometer to 10 nanometer resolution) sweep of the 1600-1800 nm section of the hydrocarbon band which spans from about 1650-1850 nm. Other wavelength bands are swept as well depending on what elements or measurements are desired in measuring spectral transmissivity, absorbance or luminance response in the HRS. From these transmissivity, luminance or absorbance spectral measurements, the present invention quantifies aromatics, olefins (unlikely in crude oil but common in OBM filtrate), saturates, methane and possibly ethane, propane, and butane. With this high resolution SLD, TOF spectroscopy, referred herein as HRS, the present invention determines or estimates the percentage of oil based mud (OBM) filtrate contamination downhole in a formation fluid sample, particularly if the OBM contaminants are aromatic-free but olefin-rich. The present invention estimates the degree of formation fluid clean up or removal of contamination by monitoring a property of OBM present in a formation fluid.

Furthermore, with high resolution provided by the present invention, the present invention determines or estimates the isotopic ratios of methane ($^{13}C/^{12}C$) or isotopic ratios of water (for different oxygen isotopes) or quantifies gases such $CO_2$ (e.g., 1434 nm=6975 $cm^{-1}$, 1572 nm=6361 $cm^{-1}$, 1961 nm=5100 $cm^{-1}$, 1996 nm=5010 $cm^{-1}$, 2058 nm=4860 $cm^{-1}$) or $H_2S$ (e.g. 1313 nm=7616 $cm^{-1}$, 1578 nm=6337 $cm^{-1}$, 1934 nm=5170 $cm^{-1}$). The primary commercial reason for determining isotopic ratios such as $^{13}C/^{12}C$ or $^{17}O/^{18}O$ is to assess the compartmentalization of a reservoir, which means to determine whether different sections of a reservoir are separate compartments (across which fluids do not flow) or whether they are connected to each other. Separate compartments must be drained separately and may need different types of processing for their fluids.

Multi-billion dollar decisions on how to develop a reservoir (well locations, types of production facilities, etc.) are based on whether or not a reservoir is compartmentalized. While a membrane can be used to separate gas from liquid to perform gas isotopic ratio analysis, it is also possible to assess compartmentalization using analysis of phytane/pristane ratios of liquid crude oil or by using any other distinguishing features such as any unexpected subtle differences in the fluid spectra that are capable of being resolved using a tunable optical filter. Gravity segregation will cause some expected spectral differences in fluids from different depths even when there is no compartmentalization. For example, one expects the top of a column of crude oil to be more gas rich than the bottom. For a 2 mm path length, the dominant liquid (C6+) hydrocarbon optical absorption peaks are near 1725 nm, while the corresponding absorbance peaks of hydrocarbon gases such as methane, ethane, propane, butane, lie between 1677 nm and 1725 nm. Subtle differences in spectra outside the regions where these hydrocarbon gases absorb are unexpected and therefore provide evidence of compartmentalization.

In another embodiment, a set of TOFs are provided to measure over a set of wavelength regions of interest corresponding to wavelengths associated with parameters of interest where each TOF is tuned over a different relevant wavelength region.

Turning now to FIG. 1, FIG. 1 schematically represents a cross-section of earth 10 along the length of a wellbore penetration 11. Usually, the wellbore will be at least partially filled with a mixture of liquids including water, drilling fluid, and formation fluids that are indigenous to the earth formations 10 penetrated by the wellbore 11. Suspended within the wellbore 11 at the bottom end of a wireline 12 is a formation fluid sampling tool 20. The wireline 12 is often carried over a pulley 13 supported by a derrick 14. Wireline deployment and retrieval is performed by a powered winch carried by a service truck 15, for example. In another illustrative embodiment, the tool 20 can also be deployed from a drill string or coiled tubing or any other suitable downhole deployment mechanism.

Figure 2:
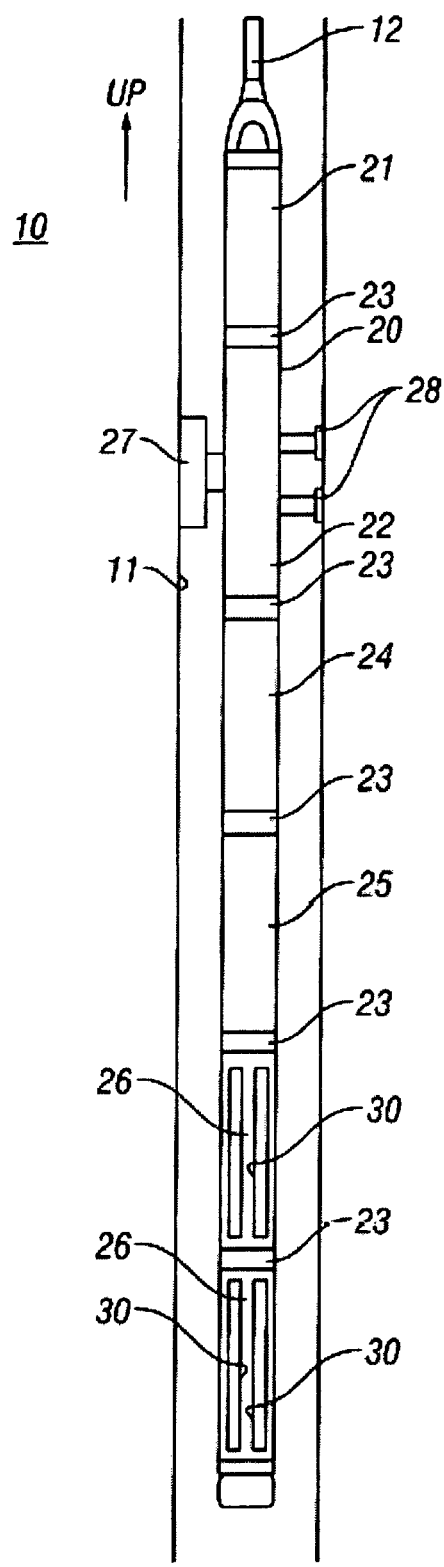
FIG. 2 is a schematic of an illustrative embodiment of the invention in operative assembly with cooperatively supporting tools.

Pursuant to the present invention, an exemplary embodiment of a sampling tool 20 is schematically illustrated by FIG. 2. Such sampling tools comprise an assembly of several tool segments that are joined end-to-end by the threaded sleeves or mutual compression unions 23. An assembly of tool segments appropriate for the present 20 invention may include a hydraulic power unit 21 and a formation fluid extractor 23. Below the extractor 23, a large displacement volume motor/pump unit 24 is provided for line purging. Below the large volume pump is a similar motor/pump unit 25 having a smaller displacement volume that is quantitatively monitored. Ordinarily, one or more sample tank magazine sections 26 are assembled below the small volume pump. Each magazine section 26 may have three or more fluid sample tanks 30.

The formation fluid extractor 22 comprises an extensible suction probe 27 that is opposed by bore wall feet 28. Both, the suction probe 27 and the opposing feet 28 are hydraulically extensible to firmly engage the wellbore walls. Construction and operational details of the fluid extraction tool 22 are well known in the art.

Figure 3:
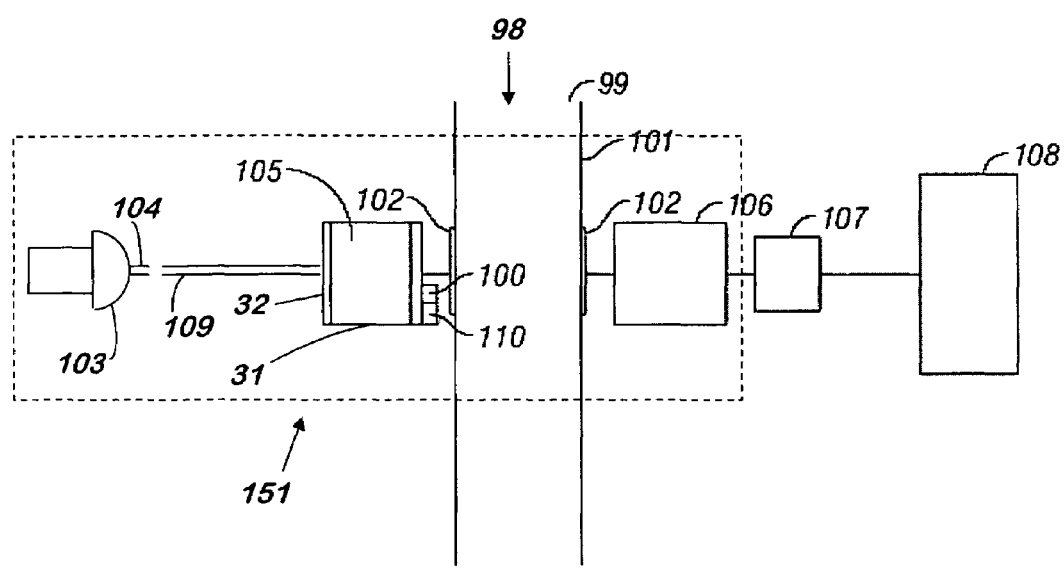
FIG. 3 an illustration of an exemplary sample chamber and high resolution spectrometer using narrow band light source and an optical filter for analysis of a downhole formation fluid sample.

Turning now to FIG. 3, in an exemplary embodiment, a flow path 98 through a sample chamber 101 provides one or a pair of high pressure sapphire windows 102 and a SLD 103 TOF 105 and spectral light detector 106 comprise high resolution spectrometer (HRS) 151 for optical analysis of parameters of interest for formation fluid sample 99. The SLD TOF high resolution spectrometer, 151 comprises a SLD light source 103 for emitting a narrow light beam 104, through an optical fiber 109 to a tunable optical filter 105. The narrow light beam 104 is filtered by TOF 105 and the filtered light output by TOF 105 passes through fluid sample 99 and impinges upon a spectral light detector 106. In another illustrative embodiment, the SLD 103 directs the narrow light beam 104 to TOF 105 without using the fiber 109. The use of the word "light" in the example and specification is intended to include all frequencies of light including but not limited to visible, near infrared, mid infrared and ultraviolet light. The output of the spectral light detector 106 is provided to an analog to digital converter 107 for digitization and transport to a processor 108. The processor uses chemometric equations derived from a group of samples measured at high resolutions of 1 nm to 30 picometers ($3 \times 10^{-12}$ meters) wavelength resolution, which prior to the present invention was not available downhole for analysis of a sample downhole or at the surface. The derivation of these equations at such high resolution of 1 nm to 30 picometers provides new and useful analysis and determinations to be made downhole as to the content and composition, physical and chemical properties of gases and fluid at downhole temperatures and conditions.

In an illustrative embodiment, the TOF 105 can be a fiber Fabry-Perot tunable filter widely available commercially which has been widely used in the communications industry for multiplexing communications over optical fiber channels. The operation of a Fabry-Perot tunable filter is discussed in U.S. Pat. No. 6,426,830 which is incorporated herein by reference in its entirety. In another illustrative embodiment, the optical filter is a fixed bandwidth and center frequency.

Figure 4:
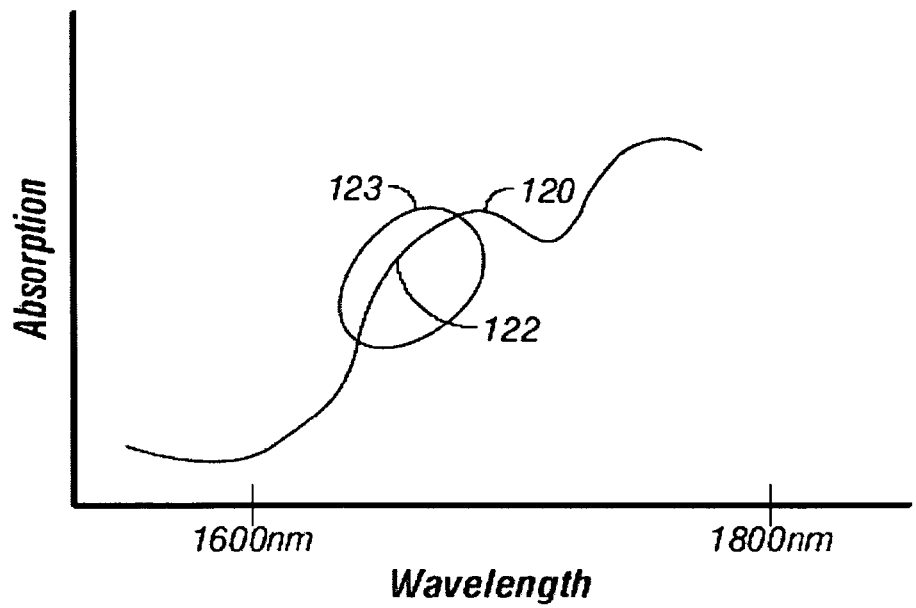
FIG. 4 is an illustration of typical downhole spectrum showing absorbance versus wavelength.
Figure 5:
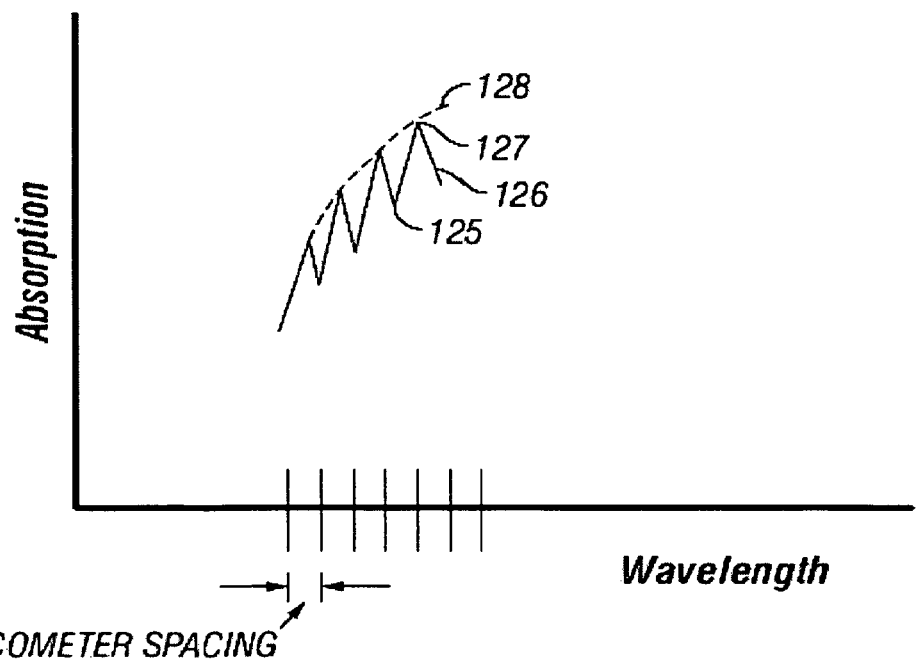
FIG. 5 is an illustration of the high resolution spectrometer (HRS) spectrum showing a 30 picometer resolution.

Typical downhole spectrometers are relatively broad band as shown in FIG. 4. The typical downhole spectrometer covers of wavelength region of 400 nm to 2000 nm with 10 to 20 channels each of which has a band width of 10-25 nm full width at half maximum. However, typically only 1 to 3 channels cover the hydrocarbon band between 1600 nm and 1800 nm into 10-20 channels. A curve 120 of optical absorbance versus wavelength is shown in FIG. 4. A portion of segment 122 of curve 120 is encircled 123 and expanded in FIG. 5. As shown in FIG. 5, the smooth appearance of the curve 120 is actually a series 126 of closely-spaced peaks 127 and valleys 125 but not detectable at lower resolutions of the typical downhole spectrometer. The HRS of the illustrative embodiment using a tunable optical filter provides a resolution of 30 picometers over a tunable wavelength of 100 nm. Thus, high resolution chemometric correlation equations are derived with the present invention from 1 nm to 30 picometers resolution training set spectra so that HRS spectral analysis previously not possible downhole is made available by the present invention.

Using wavelength modulation spectroscopy (WMS), sweeping or modulating the center frequency for the TOF, the peaks 127 and valleys 125 of curve 126 can be detected to obtain the slope of the absorbance curve to determine or estimate the absorbance at one or more particular wavelengths and perform compositional analysis therefrom. The slope 128 of the peaks of the curve 126 can also be detected and processed to determine or estimate the absorbance at one or more particular wavelengths and perform compositional analysis therefrom.

A sorption cooling unit 121 is provided that cools the SLD, TOF, and optical detector comprising the HRS if needed. The sorption cooling units 121 can be positioned adjacent the SLD, TOF and/or optical detector of the HRS and other electronics downhole as necessary to obviate the adverse affects of downhole temperatures. Sorption cooling unit 121 is described in co-owned U.S. Pat. No. 6,877,332 entitled "Downhole Sorption Cooling in Wireline Logging and Monitoring While Drilling" by Rocco DiFoggio, incorporated herein by reference in its entirety.

A trained neural network or chemometric equation resident in the processor 108 and developed based on a correlation between physical properties or parameters of interest for a gas or fluid and measured spectral content of a gas or fluid is used to estimate physical properties or parameters of interest (gas/oil ratio, GOR, API gravity, permeability, Nuclear Magnetic Resonance relaxation time, mobility, etc.) for an unknown fluid or gas sample for which the SLD TOF HRS is used to measure spectral data to estimate or determine composition (chemical parameters) and physical parameters content.

Figure 6:
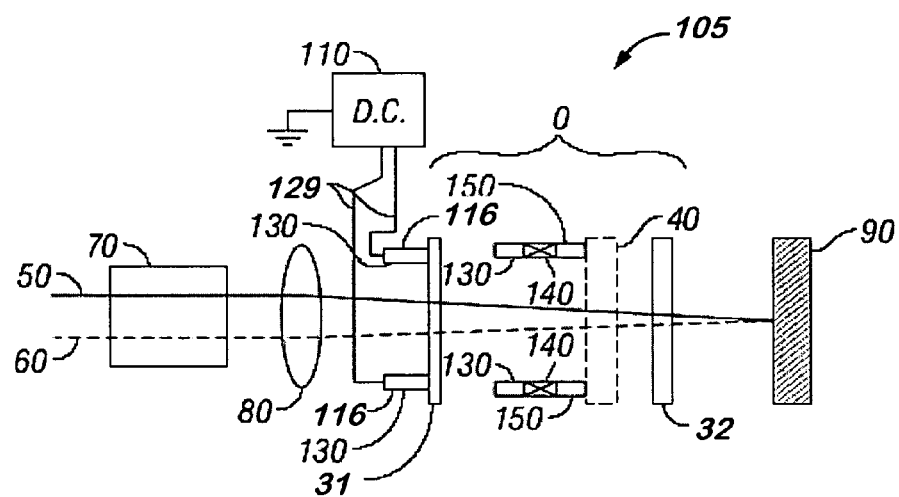
FIG. 6 is a schematic of a Fabry-Perot filter employing MEMS technology in accordance with the present invention.

Referring now to the drawings, by way of illustrative example a Fabry-Perot filter of the present invention is depicted in FIG. 6 and identified by the general reference numeral 10. Fabry-Perot filters are well-known in the optoelectronics art and, indeed, were invented over eighty years ago in conjunction with the study of optics and light physics especially as these fields developed interferometers and interferometric techniques. Hence, the general optical theory of Fabry-Perot interferometers is well understood.

Fabry-Perot filter 105 includes a first mirror 32 that is positionally fixed. A second mirror 31 that is movable and substantially optically aligned with first mirror 32 forms a cavity or etalon 40 having a length 1. The length 1 is varied in the direction of the length of cavity 40 as second mirror 31 moves transversely along the direction of length 1 when filter 105 is being tuned in accordance with the invention as discussed in greater detail below. Mirrors 31, 32 are preferably highly polished reflective mirrors which couple an input optical fiber 50 to an output optical fiber 60 through a two-fiber capillary 70 that holds the fibers 50, 60 in optical alignment with mirrors 31, 32 and mechanically holds fibers 50, 60 within filter 105.

A lens 80 is located proximate the output position of input fiber 70 and focuses light from fiber 70 onto the mirrors 31, 32 to ensure that all of the light emitted from input fiber 70 to cavity 40 is captured within cavity 40. Although lens 80 is depicted for illustrative purposes as a concave lens, other types of lenses are of course usable in filter 105 to focus the light on mirrors 31, 32 such as, for example, a convex, a planar, a circular and cylindrical lenses. As will be understood by those skilled in the art, mirrors 31, 32 are only partially reflecting which allows the cavity to be irradiated only with that desired amount of light intensity which will be multiplexed or demultiplexed by filter 105. Even more preferably, a high reflectivity mirror 90 is included in or with filter 105 at the far end of cavity 40 for coupling the input fiber to the output fiber, and for ensuring that any light which unintentionally exits cavity 40 is reflected back to the cavity so that the filter is low-loss.

In one aspect of the invention, MEMS or piezoelectric devices are disposed in contact with second mirror 31 for operatively applying forces to move or translate second mirror 31 along the lengthwise or optical axis of cavity 40 and thereby vary the length 1. MEMS and piezoelectric technology is well known to those skilled in the art. MEMS and is a process whereby micron-sized mechanical devices are fabricated on silicon wafers by photolithography and etching techniques. These mechanical devices are formed on integrated circuit chips such that devices that incorporate MEMS technology is essentially become miniature electromechanical systems. MEMS devices are activated by analog voltages which create an electric field that will cause the MEMS devices to physically deflect since they are made of silicon and therefore respond to the electric field.

Accordingly, a DC power supply 110 controlled by processor 108 is connected to MEMS or piezoelectric devices 116 through leads 129 to bias MEMS devices 116 and cause transverse movement of variable mirror 31, thereby changing the length of cavity 40. One of the advantages of using MEMS devices 116 on a silicon integrated circuit chip is that these devices are low power, low voltage devices.

Preferably, voltages of between about 0 and 10 volts are all that are necessary to provide the desired deflection of MEMS or piezoelectric devices 116. These low voltages ensure low attenuation of the cavity signals and low insertion losses. Applied voltages of between about 0 and 10 volts also reduce the polarization dependent loss for high signal attenuation. These results have not heretofore been achieved in the Fabry-Perot filter art. Moreover, while power supply source 110 has been shown as a DC power supply, it will be recognized by those with skill in the art that power supply 110 could alternately be an AC source with appropriate rectifying circuitry, or an AC source that directly applies power to MEMS devices 116 where MEMS devices 116 are configured for actuation by AC power. Piezoelectric technology for controlling a Fabry-Perot optical filter is also well known in the art.

MEMS devices 116 can be any kind of mechanical actuator operable to uniformly and easily move mirror 31 along cavity length 1. For example, cantilevered arms, pivot points, spring-like or other resilient mechanisms, levers, moment arms, torque generating devices, and other devices and equivalents thereof that can apply the correct amount of force to mirror 31 are all configurable in silicon MEMS devices and are within the scope of the present invention. In the currently exemplary embodiment, MEMS devices 116 are implemented by a pair of pistons 106 that are extendable to uniformly push against mirror 31 to move mirror 31 in the direction of the length of cavity 40. Pistons 106 comprise a backstop portion 130 that is physically connected to leads 129 to receive power from power supply 110. A resilient member 140 is provided to pistons 106 mechanically connected to backstop members 130 and which will move in the direction I of cavity 40 against backstop portions 130 when power is supplied from supply 110. A plunger 150 is mechanically connected to the opposite end of resilient member 140 from its connection to backstop member 130. Plunger 150 engages the surface of mirror 31 to move mirror 31 along the length of cavity 40 as force is uniformly applied by resilient member 140, as shown in phantom in FIG. 6. The dual piston MEMS system shown advantageously provides substantially equal force to the two ends of mirror 31 so that mirror 31 is uniformly advanced along the length of cavity 40.

Figure 7:
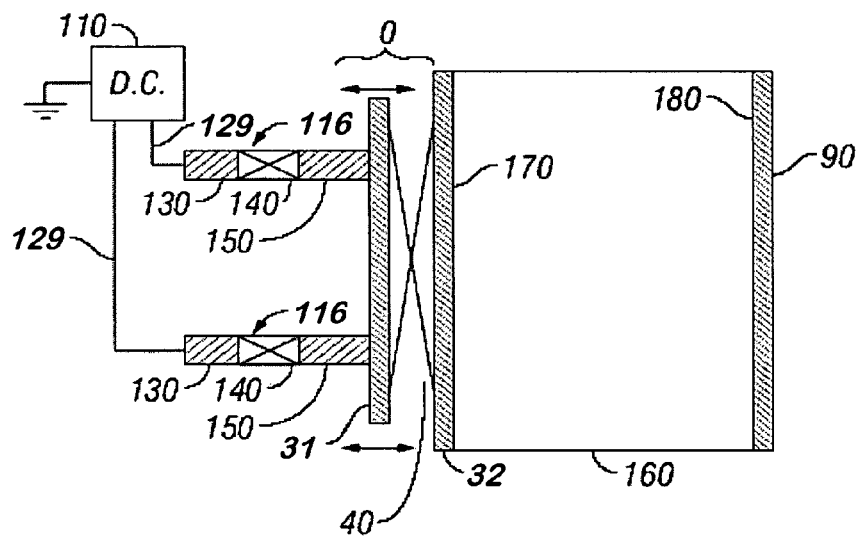
FIG. 7 is a schematic of a mirror system of the filter of FIG. 6.

Referring now to FIG. 7, an illustrative embodiment of mirrors 31, 32 and highly reflective mirror 90 is depicted. Variable mirror 31 may comprise a metallized membrane in a silicon micro-mechanical device. A substrate 160 provides a first surface 170 on which fixed mirror 32 is formed. In the illustrative embodiment of FIG. 7, fixed mirror 32 is a metallized top of surface 170. Similarly, highly reflective mirror 90 is formed on the back surface 180 of substrate 160 by metallizing the back surface of substrate 160.

The pistons 106 operate as described above against variable mirror 31 to change the length 1 of cavity 40. Substrate 160 is preferably a silicon substrate, although it will be recognized by those skilled in the art that other substrates may be employed, such as GaAs, when it is desired to micro-machine the MEMS devices from such other substrates. In either of the illustrative embodiments of FIG. 6 or FIG. 7, it is generally desirable to polish highly reflective mirror 90 at a slight angle with respect to mirrors 31, 32, e.g. about 0.5 degrees, to make mirror 90 transparent at about 1.5 micrometers wavelength.

In another embodiment, the method of the present invention is implemented as a set computer executable of instructions on a computer readable medium, comprising ROM, RAM, CD ROM, Flash or any other computer readable medium, now known or unknown that when executed cause a computer to implement the method of the present invention.

While the foregoing disclosure is directed to the exemplary embodiments of the invention various modifications will be apparent to those skilled in the art. It is intended that all variations within the scope of the appended claims be embraced by the foregoing disclosure. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

What is claimed is:

1. A method for estimating a property of a formation fluid, comprising:
    exposing a tunable optical filter to a narrow light beam from a light source;
    transmitting a selected wavelength of light from the light source to the tunable optical filter;
    tuning the tunable optical filter having a first member and a second member that are substantially parallel and not directly in contact with one another, by modulating a distance between the first member and the second member to a wavelength that overlaps a wavelength for the narrow light beam to the selected wavelength of light passed by the filter;
    exposing the fluid to light output from the filter;
    measuring a light output interaction with the fluid; and
    estimating a property of the formation fluid from the measured interaction.

2. The method of claim 1, wherein the light source is a super luminescent diode.

3. The method of claim 1, wherein exposing further comprises:
    launching the narrow light beam through an optical fiber into the filter.

4. The method of claim 1, further comprising:
    matching an etendue for the filter to an etendue for the light beam source.

5. The method of claim 1, further comprising:
    exposing a second optical filter to the narrow light beam;
    exposing a secondary formation fluid to a second output light from the second optical filter;
    measuring an interaction between the second output light and the secondary formation fluid;
    estimating a property of the secondary formation fluid from the measured interaction;
    comparing the property of the formation fluid to the property of the secondary formation fluid; and
    determining whether the formation fluid derives from the same formation compartment as the secondary formation fluid.

6. The method of claim 1, wherein the narrow light beam has a diameter in a range between 1 micron and 100 microns.

7. The method of claim 1, wherein the narrow light beam has a diameter of approximately 8 microns.

8. The method of claim 1, further comprising:
    estimating at least one of carbon number distribution and percentage of drilling mud contamination.

9. An apparatus for estimating a property of a formation fluid, comprising:
    a narrow light beam source;
    a system in optical communication with the light source, the system comprising a) an optical filter having a first member substantially parallel to a second member with which the first member is not in direct contact, wherein the optical filter is a tunable optical filter tuned to a wavelength overlapping a wavelength for the narrow light beam source and b) a formation fluid;
    a circuit that modulates a distance between the first member and the second member;
    a sensor in optical communication with the system; and
    a processor in data communication with the sensor,
    wherein the processor estimates the property of the formation fluid from the sensor output.

10. The apparatus of claim 9, wherein the narrow light beam source is a super luminescent diode.

11. The apparatus of claim 9 further comprising:
    a second system comprising a) a second optical filter and b) a secondary formation fluid, wherein the second system is in optical communication with the narrow light beam source and the sensor, and wherein the processor compares the sensor output of the system to the sensor output from the second system in order to estimate the property of the formation fluid.

12. The apparatus of claim 9, wherein the circuit further comprises a device that modifies a distance between the first member and the second member selected from the group consisting of a piezoelectric element and a micro-electromechanical device.

13. The apparatus of claim 9 wherein the light source and the optical filter have a substantially matched etendue.

14. The apparatus of claim 10, further comprising:
    an optical fiber in optical communication with the light source and optical filter.

15. The apparatus of claim 9, wherein the narrow light beam source emits a light beam having a diameter substantially in the range of 1-100 microns.

16. The apparatus of claim 9, wherein the light beam source emits a light beam having a diameter of substantially 8 microns.

17. The apparatus of claim 9 wherein the processor estimates at least one of carbon number distribution and percentage of drilling mud contamination.

18. A downhole tool for estimating a property of a formation fluid, comprising:
   a tunable optical filter having a first member substantially parallel to a second member with which the first member is not in direct contact, wherein the optical filter is a tunable optical filter tuned to a wavelength overlapping a wavelength for the narrow light beam source and b) a formation fluid;
   a circuit that modulates a distance between the first member and the second member;
   a super luminescent diode that illuminates an optical filter in optical communication with the formation fluid wherein the optical filter is a tunable optical filter tuned to a wavelength overlapping a wavelength for the super luminescent diode;
   a photodetector that measures an interaction between light output from the filter with the formation fluid; and
   a processor in data communication with the photodetector that estimates a property of the formation fluid from the measured interaction from the photodetector.

\* \* \* \* \*